United States Patent
Jeraj

(10) Patent No.: US 11,856,597 B2
(45) Date of Patent: Dec. 26, 2023

(54) RADIO FREQUENCY (RF) COMMUNICATION SYSTEM PROVIDING CHANNEL SELECTION BASED UPON HISTORICAL RF SPECTRAL DATA AND RELATED METHODS

(71) Applicant: L3Harris Technologies, Inc., Melbourne, FL (US)

(72) Inventor: Janez Jeraj, Farmington, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 175 days.

(21) Appl. No.: 17/454,496

(22) Filed: Nov. 11, 2021

(65) Prior Publication Data
US 2023/0145990 A1 May 11, 2023

(51) Int. Cl.
*H04W 72/08* (2009.01)
*H04W 72/54* (2023.01)

(52) U.S. Cl.
CPC .................................. *H04W 72/54* (2023.01)

(58) Field of Classification Search
CPC ..... H04L 5/0062; H04L 5/0069; H04L 5/006; H04L 1/04; H04W 72/54; H04W 24/02; H04W 72/02; H04W 24/00; H04B 7/0426; H04B 1/71632
See application file for complete search history.

(56) References Cited

U.S. PATENT DOCUMENTS 8,363,700 B2 1/2013 Michaels et al.
2017/0055266 A1 2/2017 Keerthi

*Primary Examiner* — Jung Liu
(74) *Attorney, Agent, or Firm* — ALLEN, DYER, DOPPELT, + GILCHRIST, P.A. Attorneys at Law

(57) ABSTRACT

A radio frequency (RF) communication system may include a first radio and a second radio being relatively movable. The first radio may include an RF transceiver configured to operate on a selected RF channel from among a plurality of different RF channels, and a controller coupled to the RF transceiver. The controller may be configured to obtain historical RF spectral data over time, position and RF channel, as the first and second radios move relative to one another, determine at least one power null from the historical RF spectral data, and dynamically select an RF channel from among the plurality thereof based upon the at least one power null.

24 Claims, 7 Drawing Sheets

RADIO FREQUENCY (RF) COMMUNICATION SYSTEM PROVIDING CHANNEL SELECTION BASED UPON HISTORICAL RF SPECTRAL DATA AND RELATED METHODS

TECHNICAL FIELD

The present application relates to communications systems and, more particularly, to radio frequency (RF) communications systems and related methods.

BACKGROUND

Mobile radios may be deployed in numerous environments for various purposes. For example, in many applications it is desirable to transmit information from a remote location to a base station or other mobile radios in real time. However, limited communication ranges and free line of sight may make direct transmissions from distant targets impossible, such as when operating over rough terrain and long distances. Problems may also arise in contested RF propagation environments such as those involving densely occupied radio frequency (RF) spectrum multitude, interference or jamming signals, multipath channels such as those found in urban areas, rural areas, mountains or areas with dense foliage to name just a few.

One approach to mitigating the effects of multipath is set forth in U.S. Pat. No. 8,363,700 to Michaels et al. This patent discloses a receiver in a communications system that includes an antenna system for receiving a composite signal comprising multi-path components associated with the multi-path images of a transmitted signal. The receiver also includes a correlation system for correlating the received composite signal with a spreading sequence using different time-offset values to generate time-offset de-spread signals associated with at least a portion the multi-path images, where the spreading sequence is based on sequence of discrete-time chaotic samples. The receiver further includes receiver fingers for generating synchronized de-spread signals from the time-offset de-spread signals based at least on said time-offset values. The receiver also includes a combiner for combining the de-spread signals into a combined coherent de-spread signal.

Despite the advantages of such systems, further enhancements in RF communications systems to facilitate channel switching in degraded signal environments may be desirable.

SUMMARY

A radio frequency (RF) communication system may include a first radio and a second radio being relatively movable. The first radio may include an RF transceiver configured to operate on a selected RF channel from among a plurality of different RF channels, and a controller coupled to the RF transceiver. The controller may be configured to obtain historical RF spectral data over time, position and RF channel, as the first and second radios move relative to one another, determine at least one power null from the historical RF spectral data, and dynamically select an RF channel from among the plurality thereof based upon the at least one power null.

In an example embodiment, the controller may be configured to dynamically select the RF channel based upon a slope relative to the at least one power null (e.g., going out of a power null toward the peak). More particularly, the controller may be configured to dynamically select the RF channel by switching from an RF channel along a downward slope relative to the at least one null and to another RF channel along an upward slope relative to the at least one null, for example.

By way of example, the controller may be configured to perform channel sounding to obtain the historical RF spectral data. Also by way of example, the controller may be configured to perform spectral sensing to obtain the historical RF spectral data.

In some embodiments, the controller may be further configured to display a map with a relocation point thereon based upon the historical RF spectral data. The controller may also be configured to cause the RF receiver to switch frequencies based upon the historical RF spectral data in an example embodiment.

In accordance with one example implementation, the RF receiver may comprise a Direct Sequence Spread Spectrum (DSSS) receiver, and the controller may be configured to determine relative timing for position location information based upon DSSS. The controller may be configured to communicate with a cloud storage device to store and retrieve the historical RF spectral data in one example implementation, or may have local maps of the historical RF spectral data in another example implementation. Also by way of example, the RF receiver may comprise an Orthogonal Frequency-Division Multiplexing (OFDM) receiver. In accordance with another example, the RF receiver may comprise an RF rake receiver.

A related radio, such as the one described briefly above, and method for using the radio are also provided. The method may include obtaining historical RF spectral data over time, position and RF channel as the radio moves relative to another radio, determining at least one power null from the historical RF spectral data, and dynamically selecting an RF channel from among the plurality thereof based upon the at least one power null.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 3:
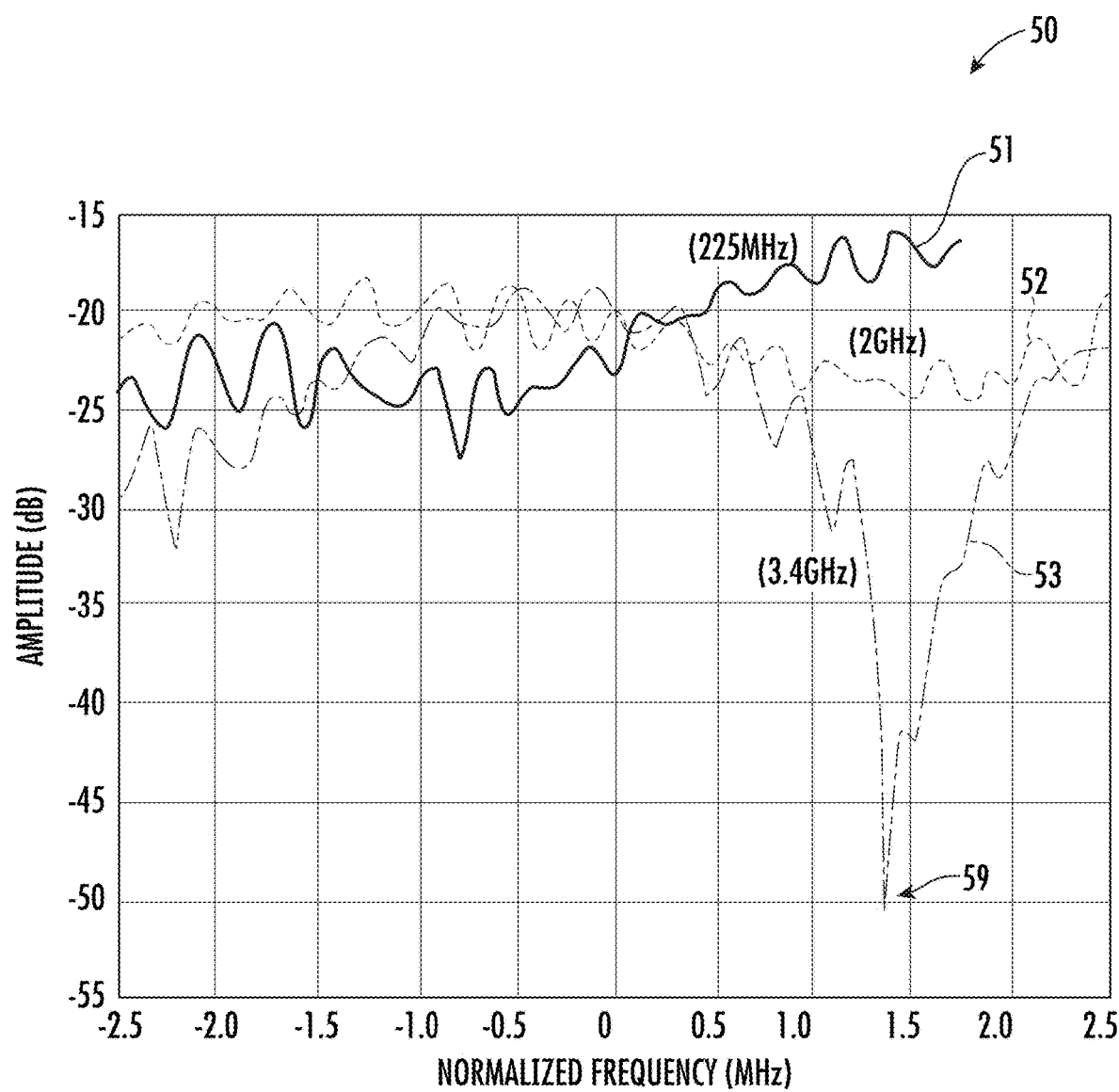
FIGS. 3-5 are graphs illustrating time and frequency variations in RF propagation channels for which historical RF spectral data may be collected by the systems of FIGS. 1 and 2.
Figure 4:
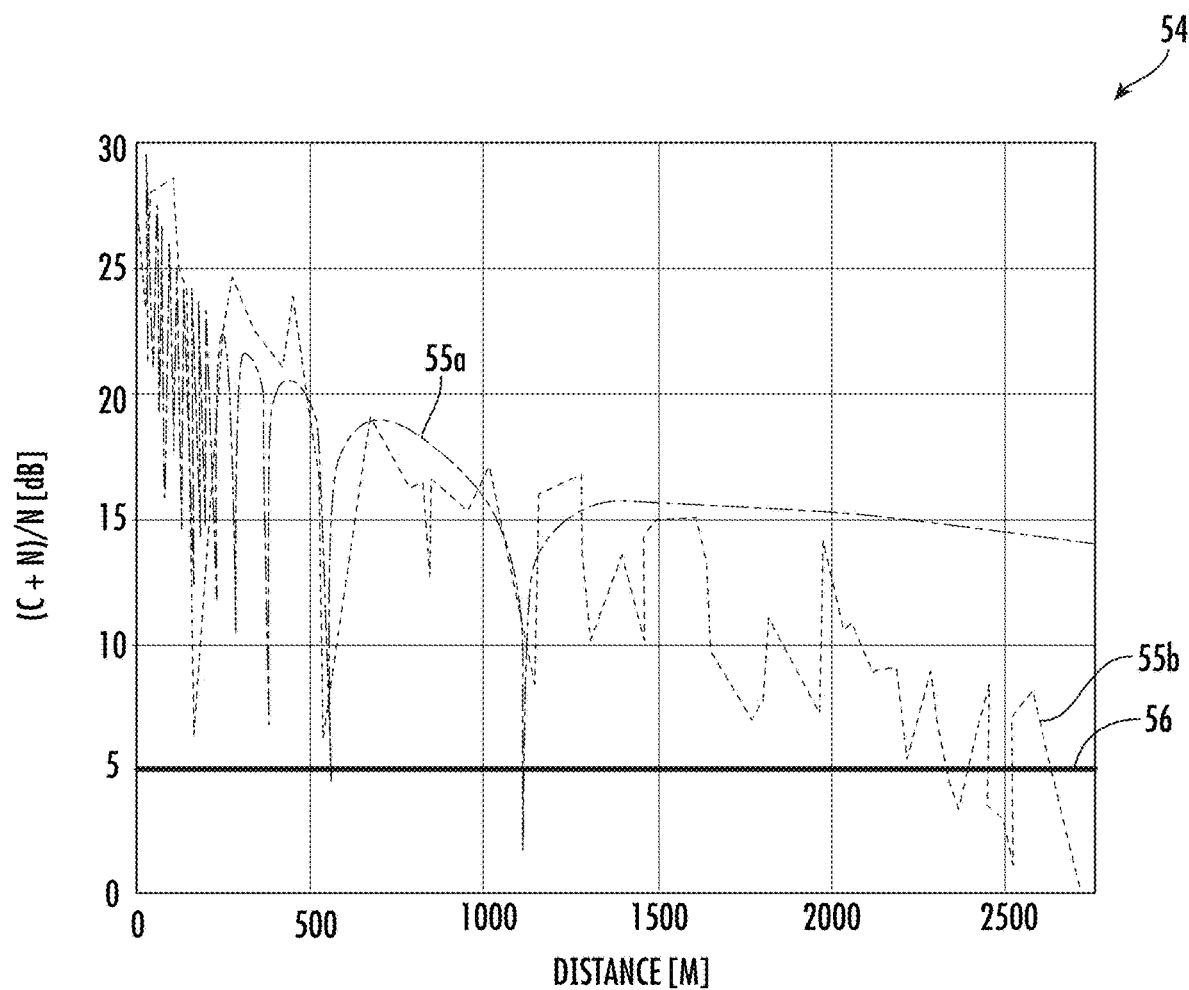
Figure 5:
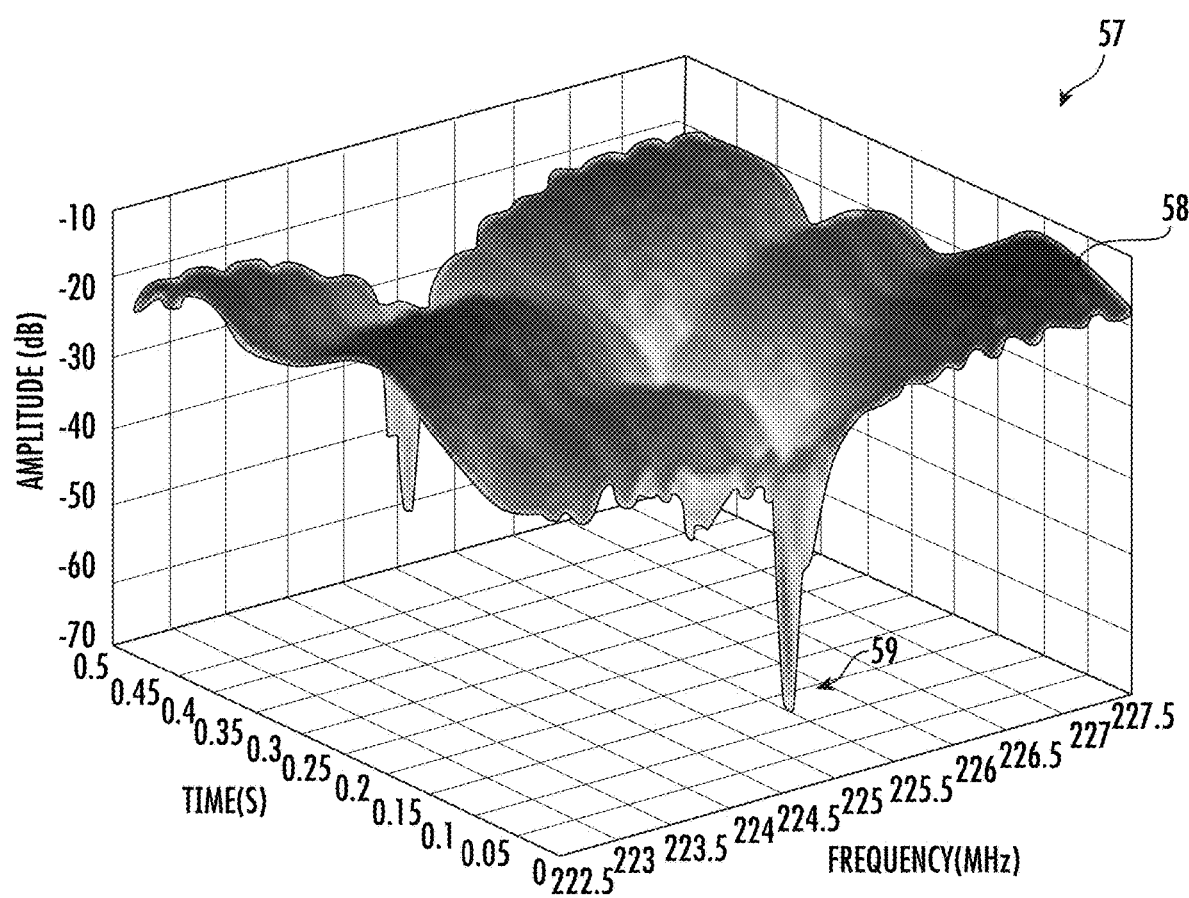

Referring initially to the graphs 50, 54, and 57 of FIGS. 3-5, and by way of background, radio propagation channels typically experience a variety of environmental propagation effects. For example, these propagation effects may occur in contested RF propagation environments, such as those involving densely occupied RF spectrum multitude, interference or jamming signals, and multipath channels such as those found in urban areas, rural areas, mountains, or areas with dense foliage. Such propagation effects (e.g., multipath/reflection, diffraction, refraction, attenuation, scattering, depolarization, etc.) strongly depend on the carrier frequency (channel) and vary with time and space.

The graph 50 illustrates propagation frequency dependence for three channels at 225 MHZ, 2 GHz, and 3.4 GHz respectively represented by plot lines 51, 52, and 53. The graph 54 illustrates the propagation effects over distance for an RF channel with a plot line 55a representing a 2-ray model and a plot line 55b representing measurements relative to a forward error correction (FEC) threshold 56. The graph 57 provides a 3D plot 58 of time-varying frequency response for an RF channel over time and frequency. The graphs 50, 54, and 57 illustrate propagation properties as two radios are moving apart, and reveal the occurrence of power nulls 59 which are highly frequency and/or location dependent. Generally speaking, the nulls are defined by downward slopes in the graphs 50, 54, and 57 that dip or fall below a signal threshold (e.g., the FEC threshold 56).

Figure 1:
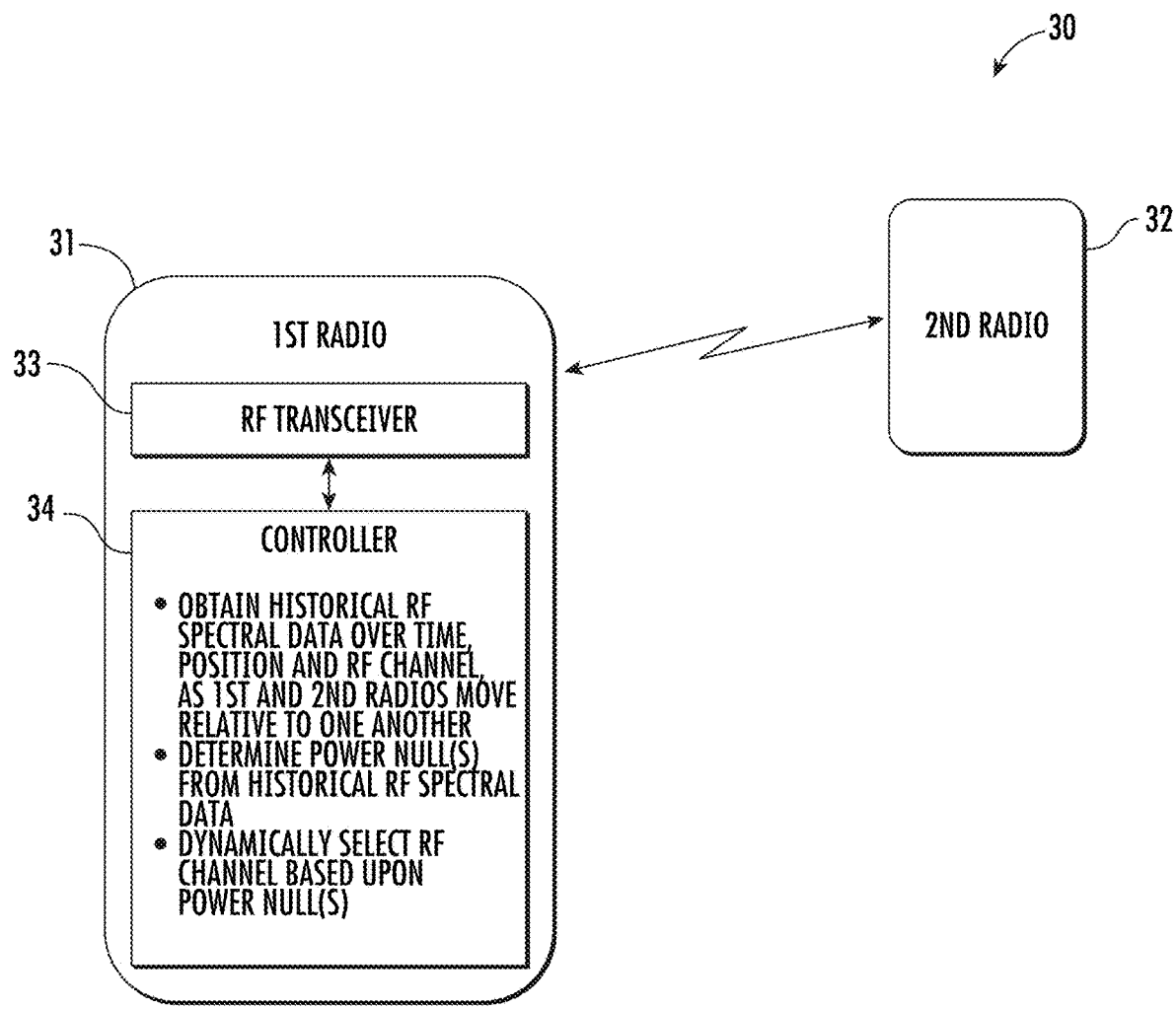
FIG. 1 is a schematic block diagram of a radio frequency (RF) communication system providing dynamic channel switching based upon historical RF spectral data in accordance with an example embodiment.
Figure 6:
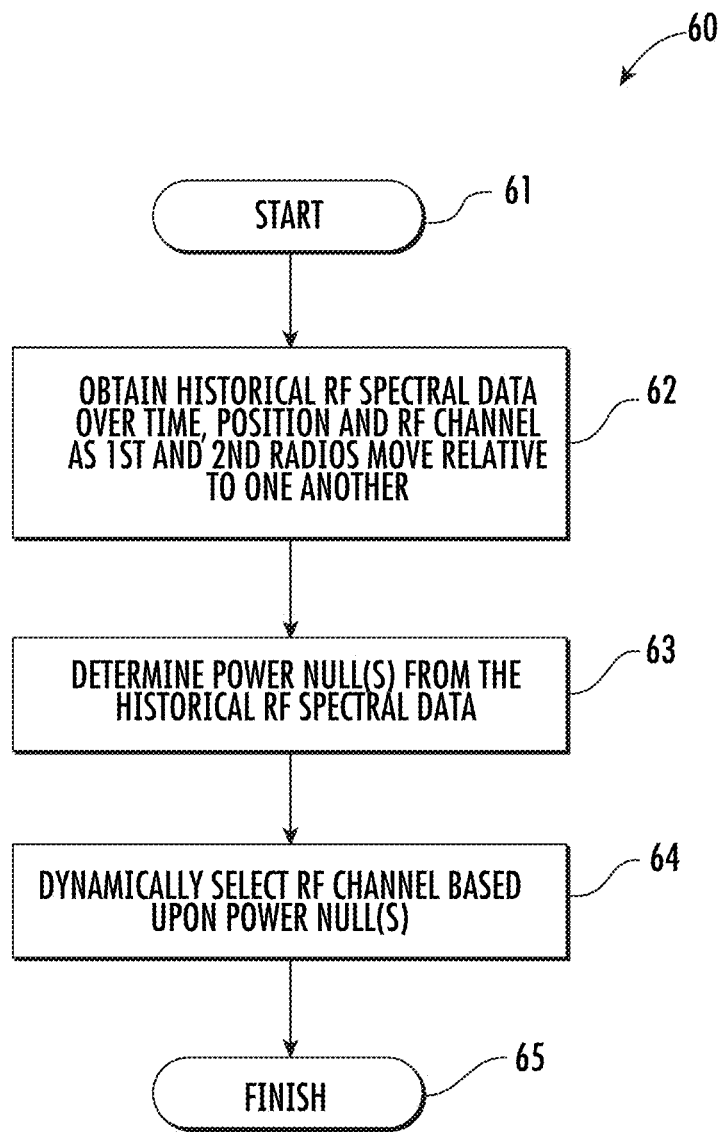
FIGS. 6 and 7 are flow diagrams illustrating example method aspects associated with the systems of FIGS. 1 and 2.

Referring additionally to FIG. 1 and the flow diagram 60 of FIG. 6, a radio frequency (RF) communication system 30 may advantageously increase communications link availability in contested RF propagation environments by collecting and utilizing historical RF spectral data for radio channel selection and/or location. The system 30 illustratively includes first and second radios 31, 32 which are relatively movable one to the other, meaning that one or more of the radios are mobile. The first radio illustratively includes an RF transceiver 33 and a controller 34 coupled to the transceiver, and the second radio may include similar components as well (not shown). The RF transceiver 33 is configured to operate on a selected RF channel from among a plurality different RF channels. Beginning at Block 61, the controller 34 may be configured to obtain historical RF spectral data over time, position and RF channel, as the first and second radios 31, 32 move relative to one another (meaning at least one of the radios is mobile), at Block 62. The controller 34 may also be configured to determine at least one power null from the historical RF spectral data, at Block 63, and dynamically select an RF channel from among the plurality thereof based upon the at least one power null, at Block 65, as will be discussed further below. The method of FIG. 6 illustratively concludes at Block 65.

More particularly, the system 30 may build a comprehensive database 35 of the historical RF spectral data for the different propagation channels. In the example illustrated in FIG. 2, the database 35 is maintained by a cloud storage device or service 36 and shared among multiple radios 31, 32, 37. That is, all of the radios 31, 32, 37 may upload and/or retrieve RF spectral data to/from the database 35 so that the data is shared among them. In other embodiments, individual databases 35 may be maintained by the radios 31, 32, 37 based upon their own RF spectral data collection for connections to a plurality of radios, and in some embodiments a combination of local and cloud databases may be used. In either case, the historical RF spectral data may be shared among the radios 31, 32, 37. As an example, a radio travelling along a specified path may be communicating with various base stations along the route, and may share the RF spectral database with other radios that take a similar route to improve signal connectivity and link availability for the latter. This way radios have a-priori knowledge of the RF channel characteristics and improve connectivity including but not limited with mechanisms such as a-priori handover, and a-priori boost of link data rates in sections with favorable RF channels. In the illustrated example, the RF transceiver 33 operates using Direct Sequence Spread Spectrum (DSSS) and Orthogonal Frequency Division Multiplexing (OFDM), although other communications formats may be used as well in different embodiments.

Figure 7:
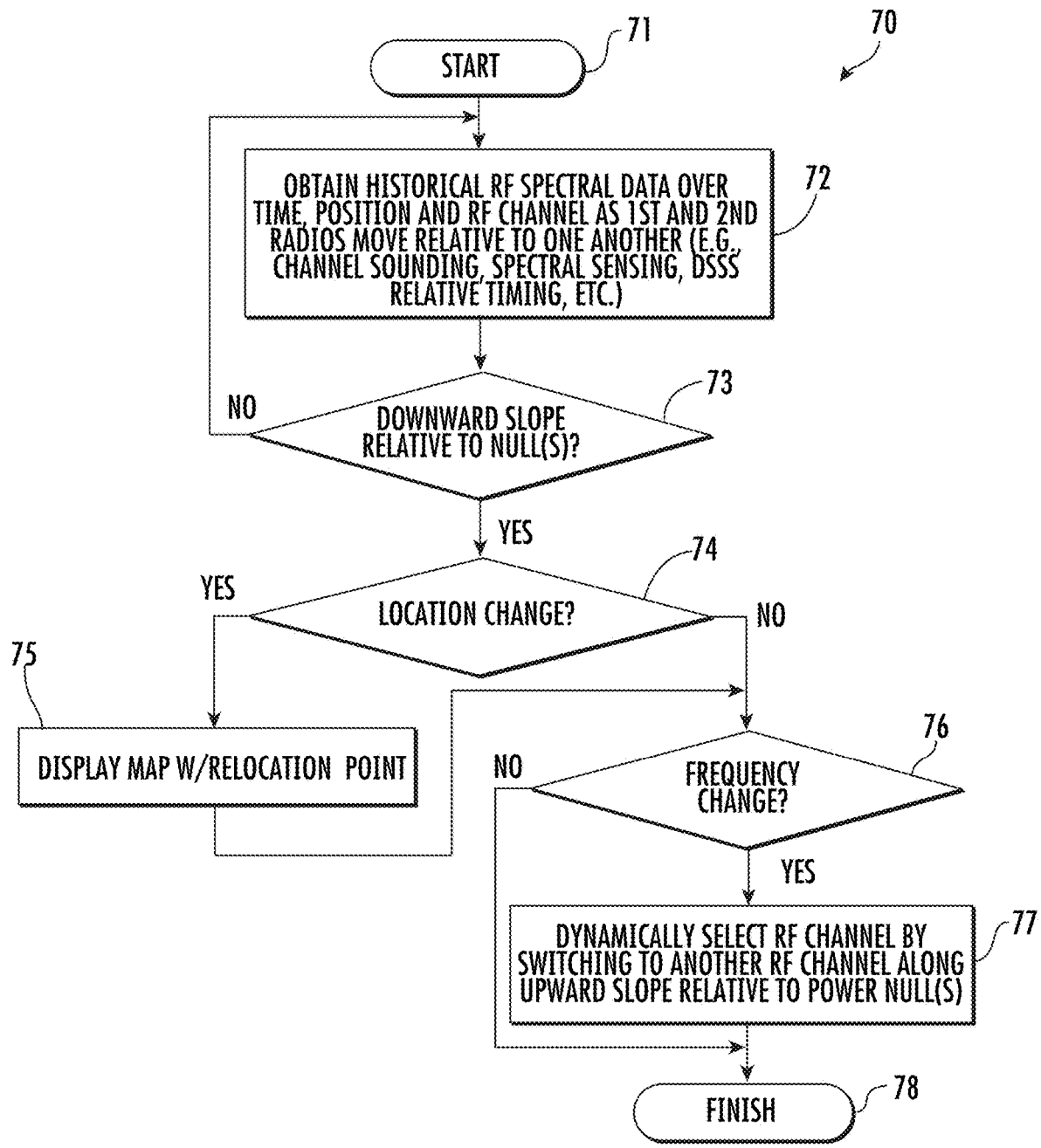

Referring additionally to the flow diagram 70 of FIG. 7, beginning at Block 71, the historical RF spectral data may be obtained (Block 72) using spectral sensing, which gives a broad spectrum overview and enables characterization. Spectral sensing output helps narrow down available channels that are possible candidates. Furthermore, channel sounding may also be used to send signals (which can be communications signals) to probe various channels properties (e.g., extracting a channel's transfer function). Locations can be obtained via Global Positioning System (GPS) or similar systems that provides users with positioning, navigation, and timing (PNT) services. In some embodiments where the RF transceivers use appropriate waveforms, the latter enable determination of relative timing between transmitter and receiver, which in turn allows for Position Location Information (PLI), even in GPS-denied areas. One or more of these and other optional measurements (e.g., Signal-to-Noise Ratio (SNR), Eb/No, location, spectral picture, Received Signal Strength Indicator (RSSI), Packet Error Rate (PER), interference power, noise figure analysis, etc.) are loaded in memory and retained for further processing and channel selection decision making.

As such, the information in the database 35 may be considered to be multidimensional in some implementations. In typical systems, much of the above-noted information is promptly discarded after its immediate use. However, by retaining such data and combining this with frequency agility and machine learning (ML)/artificial intelligence (AI), the radios 31, 32, 37 may advantageously provide a more reliable channel/communications link and rapid switching to the best available channel in any given moment based on the outputs from the intelligent algorithm. Various types of ML/AI models can be used. Some examples include but are not limited to Artificial Neural Networks (ANNs), especially Deep learning approaches, Support-Vector Machines (SVMs), decision tree learning, Bayesian networks, federated learning, etc. The algorithm not only learns and predicts based on passive observations, but also includes an agent interacting with the environment to learn and take actions that maximize the chance of maintaining a reliable link as well as avoid intentional and non-intentional jamming. The agent also uses game theory to optimize link availability. The learning algorithms build a generalized model from the data obtained from the past links, channel identification processes and jammers identified, preferring a reinforcement learning, maximizing a cumulative reward of a stable, fast communications link. The intelligent algorithm may use measurements in the database 35 to provide optimized recommendations for channel (center frequency) hop, and/or suggestion for a location move. This may be conceptually considered as opportunistic channel hopping, as the radios 31, 32, 37 use channels with the best opportunity to establish a communications link in a given moment and space. The links operate in channels that have the best propagation properties at any given time and in any given space. In other words, this helps to avoid channels with high degradation either due to multipath or jamming.

More particularly, by detecting channel degradation as the link is on a downward slope relative to or into a null as discussed above (Block 73), the radios 31, 32, 37 may advantageously notify the user to change location (Block 74) and/or channel hop to a frequency that has an upward slope out of or away from a null (Blocks 76-77), and thus provide a reliable link. The speed at which channel reallocations are executed may be enhanced through hardware implementations so that maximum data link availability is achieved, although software implementations may also be used. Some of the hardware modifications may include, but are not limited to: mechanisms for fast carrier frequency setting and fast acquisition at the frequency hop; multiple parallel waveform support; and support for multitude disparate orthogonal frequency bands such as in very different frequency regions so a large frequency hop (as opposed to regular frequency hopping as known in frequency-hoping-spread-spectrum systems) can be made to support the approach. Multitude of very-disparate frequency bands enables implementation of a measurement-based game theoretic framework in a way where the link iteratively and selfishly adapts its strategy as the best response to the strategies of one or more jammers. Since jamming is a game of resources, with jammer resources limited, the jammer resources can be spread too thinly to be effective. This approach is in contrast to a classical proactive frequency hopping scheme where a pair of transceivers that form a link switch channels once every m seconds, irrespective of whether or not there is a jammer on the current channel. Since both ends of the link run the same ML/AI algorithm using the same data, both ends of the link come to the same solution with regard to the channel hop, focusing resources, and reacting to jammer or channel nulls in a predictable manner. However, the latter appears as an unpredictable hop to an adversary that is not running that same algorithm and does not have that same data. To support this game theoretic approach, the system uses specialized hardware to perform wide-band measurements and spectral sensing so as to not just measure and remember jamming attacks and other interferences, but to also identify various channels. More particularly, the intelligent algorithm may suggest geographical moves to enable best communications links. These capabilities may also be combined with anti-jam (AJ) and low-probability of detection (LPD) capabilities inherent to some modern waveforms, for example. In some embodiments, specialized hardware such as Xilinx RFSoC or ASICs with multiple ADCs and DACs connected to RF chains of various RF frequency bands and bandwidths can be used to sense the RF spectrum and dynamically exploit available channels.

Where a relocation change is appropriate, a map (e.g., geographical maps of the RF propagation environment) may be displayed (Block 75) for an operator along with an appropriate relocation point to get away from the detected null. Some conventional approaches provide static and predetermined RF propagation maps which are generated "once-for-all-time", which do not contain new realities and do not allow for the highly dynamic nature of RF propagation, jamming and differences between radios. However, in accordance with the present approach, maps may be dynamically constructed using measurements from the radios 31, 32, 37. This allows for an operator to achieve a more reliable channel communications link where the radio may not only hop to the best available channel in any given moment, but also suggest geographical moves to enable best communications links. Moreover, the map of communications channels availability may also be generated and retained for later use (e.g., future planning). The method of FIG. 7 illustratively concludes at Block 78.

The system 30 accordingly provides intelligent, data-fusion driven opportunistic channel hopping to help maximize control and data link continuity. The links operate in channels that have the best propagation properties at any given time. In conventional approaches, channel allocation is typically rigid and predetermined, and there is no adjustability to current channel conditions, nor the capability for interference/jamming avoidance using channel hopping. Yet, in accordance with the present approach, channel selection may be based on an intelligent algorithm that uses a database which accommodates multiple sources of spectral data. The data is collected and processed in real-time to provide desired prediction capabilities (e.g., predicting frequency-dependent signal strengths in radios moving apart). As noted above, data collection may include spectral sensing, channel sounding, Eb/No, RSSI, location, time, regulatory constraints, adversaries jamming patterns, past observations, etc. Moreover, channel hopping may occur in real-time and is enabled by mechanisms such as frequency agility and fast (HDL) processing. The automated nature makes channel hopping fast and viable in situations where manual channel hopping would make it at least very inconvenient/tiresome and often impossible due speed of change required.

Spectral sensing gives a broad spectrum overview and enables characterization. Sensing output narrows down available channels/holes that are possible sounding candidates. In conventional implementations, spectral sensing is typically not used dynamically. That is, frequency allocation is predetermined and fixed and when the channel changes enough, the link is lost. As such, suddenly appearing interference/jamming signals cannot be detected nor characterized. In accordance with the present approach, sensing the entire instantaneous bandwidth in hardware may be used to reduce unobserved time durations and enable efficient channel allocation, even for very dynamic RF environments. In some embodiments, a multiphase VHDL (CHSIC Hardware Description Language) implementation may be used to enable real-time or near-real-time continual spectral sensing, for example.

With regard to channel sounding, in typical approaches the waveforms are not used for channel sensing. However, in accordance with the present approach, a signal is sent through a "candidate channel." In some embodiments, this can be done using (highly DSSS) spread waveforms. Frequency response of the channel may be extracted from the received signal/waveform. In this way, waveforms may be used not just as a comms link, but also for channel sounding.

The present approach also allows for multichannel channel sounding on top of legacy waveforms. That is, whereas conventional approaches typically do not allow non-spread waveforms to coexist in the same channel, the present approach allows waveforms such as highly-spread DSSS waveforms from L3Harris with LPD to be overlaid on top of legacy waveforms (providing the data link) to provide control and channel sounding. Moreover, the legacy waveform may experience minimal or no degradation.

Figure 2:
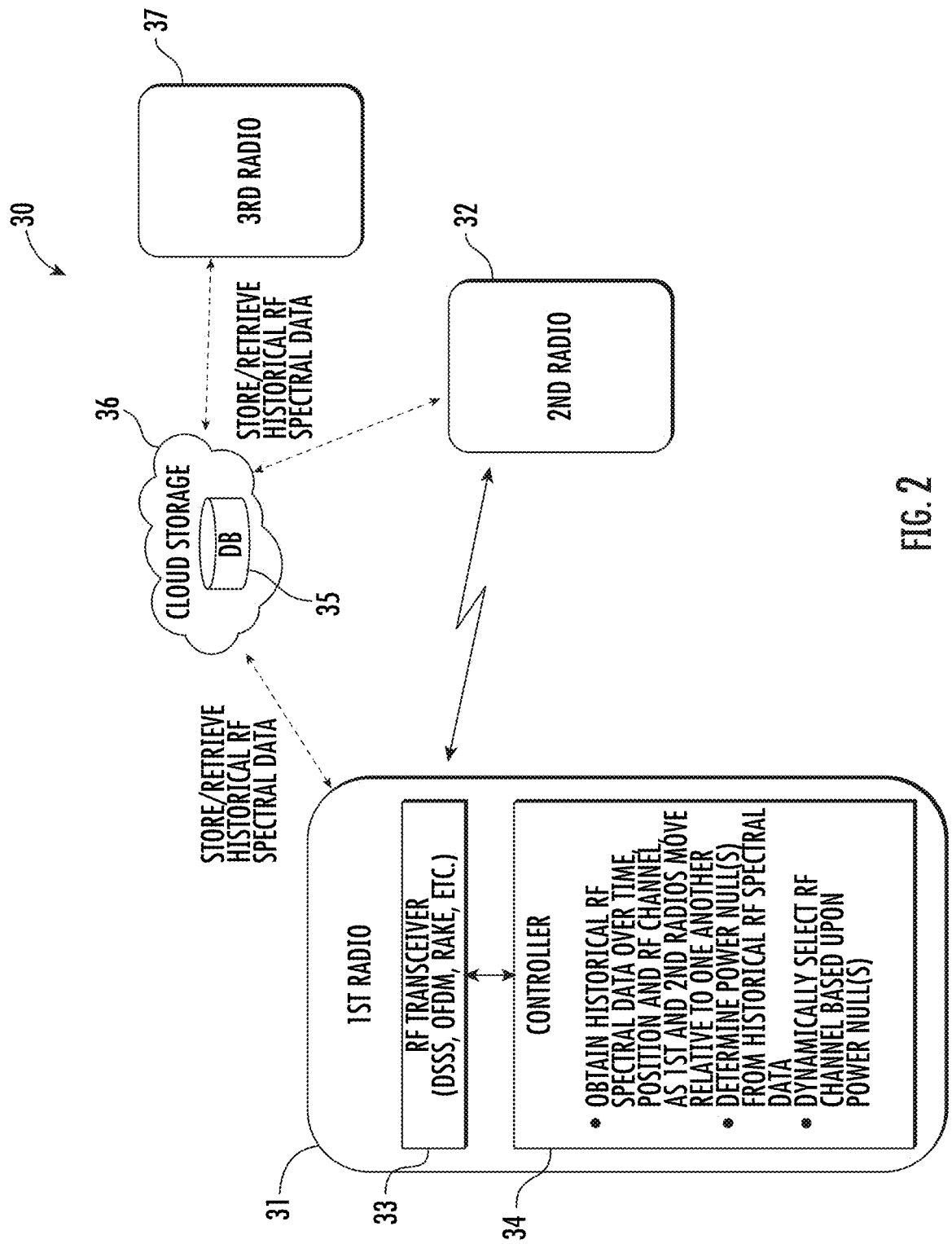
FIG. 2 is a schematic block diagram of an example implementation of the system of FIG. 1 utilizing cloud storage for the historical RF spectral data.

In some embodiments, the RF transceiver 33 may include a RAKE receiver, as shown in FIG. 2, which processes a combination of the weighted statistics and collects the energy that arrives at the receiver via a large number of propagation paths. High diversity may be enabled by a highly-spread (high-resolution chip rate) waveform. DSSS permits the resolution of a number of different (multi)paths, providing a certain amount of diversity. The RAKE receiver uses diversity by properly combining multipath components that the spread-spectrum receiver is able to resolve. A high chip rate enables a high number of resolvable components to be obtained.

The present approach also allows for the interchange of data and optimized channel allocations between different radios 31, 32, 37 within a network/mesh. In conventional approaches, propagation conditions and channel information are typically not shared between different radios. However, as discussed further above, data/measurements and results may advantageously be shared within a network/mesh to aid faster and more robust channel allocations, and consequently links. The system 30 is particularly advantageous when used for ground-based wireless communication channels, but it may also be used in ground-to-air and air-to-air configurations as well.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. A radio frequency (RF) communication system comprising:
a first radio and a second radio being relatively movable, the first radio comprising
an RF transceiver configured to operate on a selected RF channel from among a plurality of different RF channels, and
a controller coupled to the RF transceiver and configured to
obtain historical RF spectral data over time, position and RF channel, as the first and second radios move relative to one another,
determine at least one power null from the historical RF spectral data, and
dynamically select an RF channel from among the plurality thereof based upon the at least one power null.

2. The RF communication system of claim 1 wherein the controller is configured to dynamically select the RF channel based upon a slope relative to the at least one power null.

3. The RF communication system of claim 1 wherein the controller is configured to dynamically select the RF channel by switching from an RF channel along a downward slope relative to the at least one power null and to another RF channel along an upward slope relative to the at least one power null.

4. The RF communication system of claim 1 wherein the controller is configured to perform channel sounding to obtain the historical RF spectral data.

5. The RF communication system of claim 1 wherein the controller is configured to perform spectral sensing to obtain the historical RF spectral data.

6. The RF communication system of claim 5 wherein the spectral sensing comprises jammer searching.

7. The RF communication system of claim 1 wherein the controller is further configured to display a map with a relocation point thereon based upon the historical RF spectral data and channel data.

8. The RF communication system of claim 1 wherein the controller is further configured to cause the RF receiver to switch frequencies based upon the historical RF spectral and channel data.

9. The RF communication system of claim 1 wherein the RF receiver comprises a Direct Sequence Spread Spectrum (DSSS) receiver; and wherein the controller is configured to determine relative timing for position location information based upon DSSS.

10. The RF communication system of claim 1 wherein the controller is configured to communicate with a cloud storage device to store and retrieve the historical RF spectral data.

11. The RF communication system of claim 1 wherein the RF receiver comprises an Orthogonal Frequency-Division Multiplexing (OFDM) receiver.

12. The RF communication system of claim 1 wherein the RF receiver comprises an RF rake receiver.

13. The RF communication system of claim 1 wherein the controller is configured to determine the at least one power null and dynamically select the RF channel based upon at least one of a machine learning algorithm and an artificial intelligence algorithm.

14. A radio comprising:
a radio frequency (RF) transceiver configured to operate on a selected RF channel from among a plurality of different RF channels; and
a controller coupled to the RF transceiver and configured to
obtain historical RF spectral data over time, position and RF channel as the radio moves relative to another radio,
determine at least one power null from the historical RF spectral data, and
dynamically select an RF channel from among the plurality thereof based upon the at least one power null.

15. The radio of claim 14 wherein the controller is configured to dynamically select the RF channel based upon a slope relative to the at least one power null.

16. The radio of claim 14 wherein the controller is configured to dynamically select the RF channel by switching from an RF channel along a downward slope relative to the at least one null and to another RF channel along an upward slope relative to the at least one null.

17. The radio of claim 14 wherein the controller is configured to perform channel sounding to obtain the historical RF spectral data.

18. The radio of claim 14 wherein the controller is configured to perform spectral sensing to obtain the historical RF spectral data.

19. The radio of claim 14 wherein the controller is further configured to display a map with a relocation point thereon based upon the historical RF spectral data.

20. A method for using a radio comprising a radio frequency (RF) transceiver operable over a plurality of different RF channels, the method comprising:
obtaining historical RF spectral data over time, position and RF channel as the radio moves relative to another radio;
determining at least one power null from the historical RF spectral data; and
dynamically selecting an RF channel from among the plurality thereof based upon the at least one power null.

21. The method of claim 20 wherein dynamically selecting comprises dynamically selecting the RF channel based upon a slope relative to the at least one power null.

22. The method of claim 20 wherein dynamically selecting comprises dynamically selecting the RF channel by switching from an RF channel along a downward slope relative to the at least one null and to another RF channel along an upward slope relative to the at least one null.

23. The method of claim 20 further comprising performing channel sounding to obtain the historical RF spectral data.

24. The method of claim 20 further comprising performing spectral sensing to obtain the historical RF spectral data.

\* \* \* \* \*